July 29, 1969  T. A. RICH ET AL  3,458,284
BACTERIAL DETECTION
Filed Sept. 28, 1965
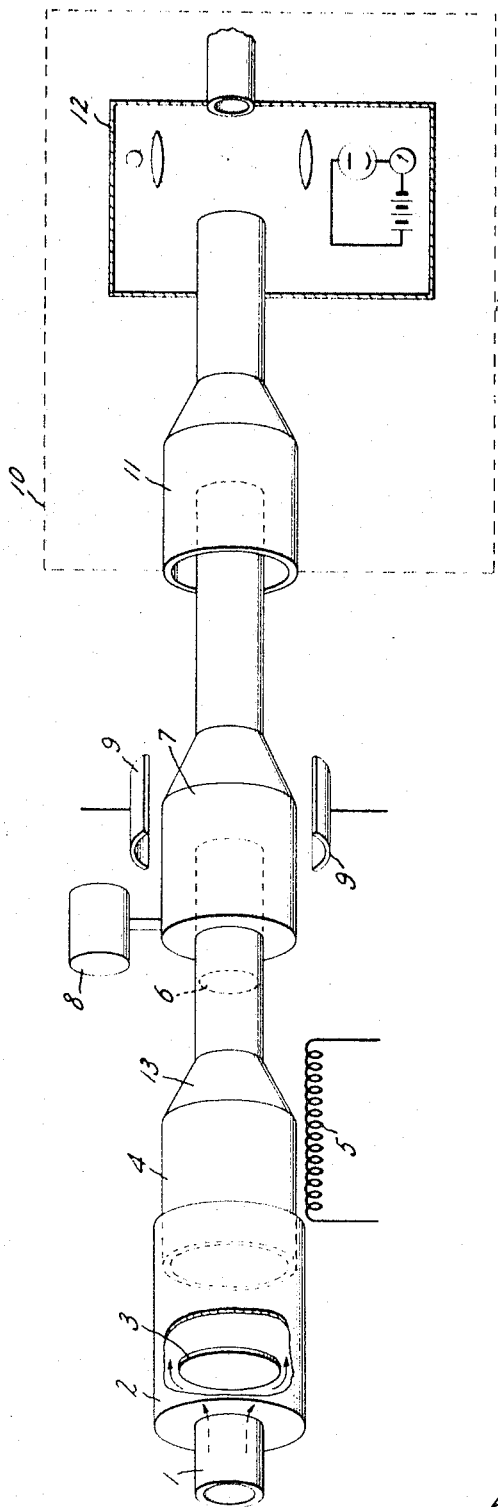
Inventors:
Theodore A. Rich,
James N. Groves,
George F. Skala,
by Charles W. Helzer
Their Attorney.

United States Patent Office 3,458,284

Patented July 29, 1969

1

3,458,284

BACTERIAL DETECTION

Theodore A. Rich, Scotia, James N. Groves, Schenectady, and George F. Skala, Scotia, N.Y., assignors to General Electric Company, a corporation of New York Filed Sept. 28, 1965, Ser. No. 490,996

Int. Cl. G01n *31/10, 31/02, 31/00*

U.S. Cl. 23—230 2 Claims

ABSTRACT OF THE DISCLOSURE

The detection of individual bacteria in a constantly flowing stream of air. Any bacteria present in the air, being composed of protein, are pyrolyzed to produce a bubble-like volume of ammonia in the air stream which is then converted to condensation nuclei which are detected. By maintaining streamline flow of the air stream, the bubble form of the ammonia gas is maintained and when converted forms a cluster or cloud of particles.

This invention relates to a means and method of detecting air pollution and more specifically to a means and method of detecting individual airborne particles which may be extremely small.

The problem or air pollution has recently given rise to many and varied air pollution detecting means, the demand for improved sensitivity of which has steadily increased. Nowadays, the added possibility of bacteriological warfare makes it extremely important to devise a means which can reliably detect small airborne particles such as bacteria which may be present in only very small quantities. Thus, it has now become very desirable to be able to detect the presence of a single bacteria in a volume of air which may be billions and billions of times larger than the volume of the bacteria itself. Heretofore a detecting device with such sensitivity capabilities has not been achieved.

One means of detecting the presence of very small particles in air that has been developed is the condensation nuclei detector. A condensation nuclei detector is a device in which air, which may contain particles, is introduced into a supersaturated air mixture. In this state water molecules are caused to condense from the humid air around a nucleus comprising the solid particles which are being detected. The resultant water particle is large enough to be detected by light scattering techniques or any other suitable means. In order to function as a detector for air pollution purposes, it is desirable to provide an extremely sensitive device, i.e., one which can detect an individual airborne particle regardless of the volume of the air under inspection.

It is therefore an object of this invention to obtain an air pollution detector of great sensitivity.

It is another object of this invention to obtain an air particle detector which is able to discern an individual particle from a volume of air which is many times larger than the volume of the individual particle.

It is a further object of this invention to obtain a bacteria detector which is able to provide a visual indication of a single bacteria.

It is still a further object of this invention to obtain a device including a condensation nuclei detector the sensitivity of which is such that an individual bacteria can be detected in any given volume of air under inspection.

These and further objects of this invention are achieved in a device which first converts the protein structure of a bacteria or other airborne particle into an ammonia bubble in a streamlined flow of air so that the ammonia gas does not become excessively mixed or diffused. After all remaining solid particles have been filtered out of the air stream the ammonia gas bubble is converted into a cloud of ammonium chloride particles which can be detected by a condensation nuclei detector of the continuous flow type. Since little mixing of the ammonia gas is allowed, the cloud of ammonia chloride particles is quite dense and can be easily detected.

2

These objects and other advantages of my invention will be apparent to one skilled in the art, and can be better understood from the following description of a preferred embodiment of my invention when taken in connection with the accompanying drawing in which:

The figure is an apparatus employing the essential elements of my invention which is able to discern a single bacteria and render it visible for detecting.

Referring now to the figure there is shown an air inlet 1 through which flows the volume of air under inspection and which may possibly contain bacteria. The air flow then strikes an impactor 2 which includes a plate 3 which blocks large high inertia airborne particles such as pollen and which allows smaller lower inertia particles to flow around its corners following paths such as indicated by the arrows. The impactor 2 is conventional and a detailed description of it and its operation will be unnecessary for an understanding of the present invention to those skilled in the art. The volume of air containing the bacteria then enters a pyrolyzer tube 4 in which the bacteria is converted to ammonia gas by the action of heat supplied by an electric radiant heater 5 which may be energized from any convenient source not shown. It is well-known to those skilled in the art that the protein in bacteria, when subjected to heat, converts into ammonia gas. This reaction is called pyrolysis and the heat which the pyrolysis apparatus utilizes may be any convenient source. While the utilization of radiant heat has been found to be preferred in the best known embodiment, applicant does not wish to be limited thereto.

Applicant has discovered that the sensitivity of a bacteria detector can be increased such that individual particles can be discerned if the air flow is kept continuous so that little or no mixing of the ammonia vapor with the air occurs after pyrolysis. When this is done the ammonia remains as a discrete "bubble" of ammonia gas which can be detected by means which will become apparent. Thus, it is desirable to insure that the air flow through the pyrolysis device is kept continuous without the occurrence of turbulence or any other event which may cause mixing.

After pyrolysis the air containing the ammonia bubble is filtered through a filtering device such as a thin porous disc 6 which removes any solid particles which may have resulted from combustion of non-protein containing substances in the pyrolysis device. A thin porous disc, if used, will not cause mixing of the air flow up but rather will pass the ammonia bubble in a streamlined flow of air.

The filtered air and ammonia bubble then enters chamber 7 where it is subjected to a saturated hydrogen chloride and water vapor gas mixture supplied from a source 8. A corona discharge, supplied by a pair of electrodes 9, converts the ammonia gas bubble to a cloud of extremely small ammonium chloride solid particles. The conversion technique utilizing the corona discharge has been found desirable but any means by which the HCl gas reacts with the ammonia gas to form ammonium chloride particles would be acceptable. The only criteria is that the reaction does not unduly disperse the $NH_4Cl$ particles thus formed. Applicant therefore does not wish to be limited to any particular type of converting technique such as the corona discharge disclosed. The resulting $NH_4Cl$ particles are so small that they are invisible but, if the flow of air is controlled properly, the particles will not disperse but will remain clustered together in a sort of cloud.

The flow of saturated air containing the cloud of ammonium chloride particles and water vapor then enters a condensation nuclei detector 10 including a chamber 11 in which ambient air at 100% humidity enters. Since the temperature of the ambient air is much lower than the temperature of the air emerging from the chamber 7 due to the heat of the pyrolysis, a supersaturated air mass results which has a humidity greater than 100%. Since this supersaturated air mass has been obtained while maintaining a continuous air flow, unlike conventional methods which obtain supersaturation by a cyclic expansion, the ammonium chloride particles remain in a discrete bundle. In such conditions, water vapor begins to condense out of the air around any solid particles existing therein. Since the only solids present in this air mass are the cluster of small ammonium chloride particles, water vapor begins to condense around these particles using them as a nucleus. As the amount of water which condenses around the ammonia chloride nucleus increases, the size of the resultant particle increases until its size is sufficient so that it can be detected with any suitable detecting device such as a scattered light measuring device 12.

It will be apparent that it is desirable to applicant's invention to maintain a continuous uniform flow of air during the conversion of the protein into ammonia gas in the pyrolysis device. Although there may be many possible ways of achieving this, and therefore applicant does not wish to be limited to any specific means for accomplishing this, one means which may be given as an example would be to heat the bacteria containing air in the pyrolysis chamber 4 without any regard to the flow characteristics of the air until a temperature is reached which is just below the critical temperature at which the protein breaks down and forms ammonia. At this point the air can be caused to flow through a chamber of converging diameter, indicated at 13, which will tend to make uniform the flow of air therethrough. At this point the temperature can be increased the last increment to the critical temperature so that the ammonia gas is formed. By doing this the ammonia gas can be expected to remain in a relatively small volume bubble with a minimum of mixing.

While I have described my invention in terms of bacteria detection, it should be apparent that any solid air particles can be so detected if they are characterized in that they contain a substance which can be converted into a gas while at the same time foreign substances do not convert into a gas but remain as solids. Therefore, I do not wish to be limited to the embodiment described but rather to the full scope and spirit of the appended claims.

What I claim as new and desire to secure by Letters Patent of the United States is:

1. The method of detecting individual airborne bacteria particles in a volume of air comprising the steps of,
    (a) converting the protein in the bacterium to be detected into ammonia gas by the action of heat while maintaining the ammonia gas as a discrete bubble in a continuous and streamlined flow of air to keep mixing of the ammonia gas to a minimum,
    (b) removing all remaining solid particles from the air flow containing the ammonia gas while still maintaining a continuous and streamlined flow of air,
    (c) converting the ammonia gas bubble into different solid particles which remain clustered together,
    (d) introducing humid air into the air flow containing the thus formed solid particles, the temperature of the humid air being lower than the temperature of the air containing the solid particles such that water particles are caused to condense on the solid particles,
    (e) detecting the water particles to provide an indication of the initial presence of bacteria in the volume of air.

2. The method of detecting individual airborne bacteria particles in a volume of air comprising the steps of,
    (a) introducing the volume of air to be inspected into a bounded volume in order to isolate the volume of air under inspection from ambient air,
    (b) causing the volume of air under inspection to flow through the bounded volume,
    (c) selectively removing solid particles from the air flow which are larger than the bacteria particles to be detected,
    (d) causing the air flow to become streamlined in order to insure that mixing of gas molecules in the air flow is kept to a minimum,
    (e) heating the air flow to a temperature such that the bacteria to be detected are converted into ammonia gas,
    (f) filtering the flow of air to remove any remaining solid particles contained therein while maintaining the flow of air continuous and streamlined,
    (g) introducing hydrogen chloride gas and water vapor into the flow of air,
    (h) causing the ammonia gas to react with the hydrogen chloride vapor to form ammonium chloride particles while still maintaining a continuous flow of air so that the ammonium chloride particles thus formed remain clustered together,
    (i) introducing humid air into the flow of air within the bounded volume, the humid air being at a lower temperature than the temperature of the flow of air within the bounded volume in order to create a super-saturated condition in which water molecules will condense around the cluster of ammonium chloride particles contained therein,
    (j) detecting the presence of the water particles thus formed with scattered light in order to provide an indication of the presence of bacteria in the initial volume of air introduced into the bounded volume.

References Cited

UNITED STATES PATENTS

| | | | |
|---|---|---|---|
| 2,774,652 | 12/1956 | Vonnegut | 23—232 |
| 3,094,392 | 6/1963 | Skala | 23—232 |
| 3,102,192 | 8/1963 | Skala | 23—232 X |
| 3,117,841 | 1/1964 | Van Luik et al. | 23—232 |

JOSEPH SCOVRONEK, Primary Examiner

U.S. Cl. X.R.

23—232, 253, 254; 88—14; 195—103.5; 204—177, 312; 250—43.5